(12) United States Patent
Repko et al.

(10) Patent No.: US 7,096,729 B2
(45) Date of Patent: Aug. 29, 2006

(54) DISPOSABLE FLUID FLOW SENSOR

(75) Inventors: Mark A. Repko, Freeport, IL (US); Richard A. Alderman, Freeport, IL (US); Duane J. Sies, Freeport, IL (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/879,223

(22) Filed: Jun. 29, 2004

(65) Prior Publication Data

US 2005/0268712 A1   Dec. 8, 2005

Related U.S. Application Data

(60) Provisional application No. 60/578,280, filed on Jun. 8, 2004.

(51) Int. Cl.
   *G01F 1/68* (2006.01)

(52) U.S. Cl. ................................. 73/204.26

(58) Field of Classification Search ............. None
See application file for complete search history.

(56) References Cited

U.S. PATENT DOCUMENTS

| | | | |
|---|---|---|---|
| 4,384,578 A | 5/1983 | Winkler | 604/114 |
| 4,813,280 A | 3/1989 | Miller, Jr. et al. | |
| 4,825,876 A * | 5/1989 | Beard | 600/488 |
| 4,829,818 A * | 5/1989 | Bohrer | 73/204.22 |
| 4,914,947 A | 4/1990 | Davidson | 73/202.5 |
| 5,050,429 A | 9/1991 | Nishimoto et al. | 73/204.26 |
| 5,081,866 A * | 1/1992 | Ochiai et al. | 73/204.21 |
| D339,995 S | 10/1993 | Wandler | D10/85 |
| 5,450,758 A | 9/1995 | Smoll | |
| 6,196,070 B1 | 3/2001 | Piascik et al. | 73/861.74 |
| 6,308,553 B1 | 10/2001 | Bonne et al. | 73/1.35 |
| 6,397,686 B1 | 6/2002 | Taivalkoski et al. | 73/861.78 |
| 6,474,155 B1 * | 11/2002 | Berkcan et al. | 73/204.23 |
| 6,550,325 B1 * | 4/2003 | Inushima et al. | 73/204.26 |

(Continued)

OTHER PUBLICATIONS

PCT-Written Opinion of the International Searching Authority – Date of Mailing Mar. 20, 2006.

*Primary Examiner*—Harshad Patel
(74) *Attorney, Agent, or Firm*—Kermit D. Lopez; Luis M. Ortiz

(57) ABSTRACT

A disposable fluid flow sensor is disclosed herein, which generally includes a flow channel assembly comprising a flow channel tube in association with a disposable flow channel portion. A sensor die is located approximate to a thin interface or membrane formed from the disposable flow channel portion, such that the sensor die measures a flow of fluid flowing through the flow channel tube and the disposable flow channel portion of the flow channel assembly. Additionally, a substrate can be provided upon which the sensor die is formed and located. A seal can also be provided for sealing the disposable flow channel portion to the flow channel tube. Such a flow sensor can be implemented in the context of a "non-isolated" sensor die approach in which the sensor die, substrate and flow tube are assembled together into a complete disposable assembly, in which a thin interface does not cover the sensor die. The flow sensor can also be implemented in the context of an "isolated" sensor die approach in which a thin membrane material or thin interface prevents the fluid from touching the surface of the sensor die. In such an "isolated" configuration, the sensor die is not actually part of the disposable flow tube assembly. The only disposable portion in this approach is the flow tube itself.

18 Claims, 4 Drawing Sheets

U.S. PATENT DOCUMENTS

| | | | |
|---|---|---|---|
| 6,553,808 B1 | 4/2003 | Bonne et al. | 73/24.01 |
| 6,715,339 B1 | 4/2004 | Bonne et al. | 73/24.01 |
| 6,813,944 B1 * | 11/2004 | Mayer et al. | 73/204.26 |
| 6,813,964 B1 * | 11/2004 | Clark et al. | 73/861.52 |
| 2002/0073772 A1 | 6/2002 | Bonne et al. | 73/204.11 |
| 2003/0107467 A1 | 6/2003 | Bonne et al. | |

* cited by examiner

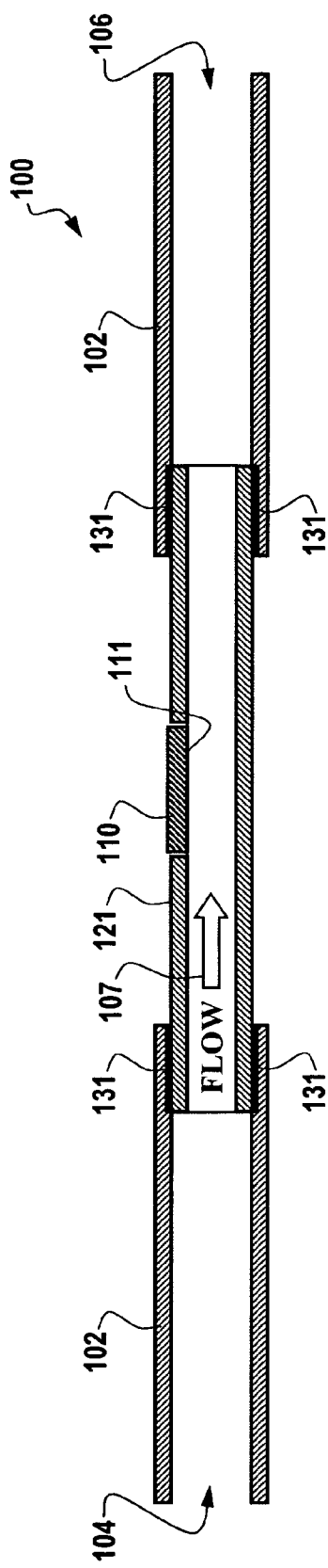

DISPOSABLE FLUID FLOW SENSOR

CROSS-REFERENCE TO RELATED APPLICATION

This patent application claims priority under 35 U.S.C. § 119(e) to provisional patent application Ser. No. 60/578,280 entitled "Disposable Fluid Flow Sensor", which was filed on Jun. 8, 2004, the disclosure of which is incorporated herein by reference.

TECHNICAL FIELD

Embodiments are generally related to flow sensing devices and techniques. Embodiments are also related to disposable flow sensor packages. Embodiments are also related to sensor die and electronic processing components thereof.

BACKGROUND OF THE INVENTION

Many sensing applications require the use of liquid flow sensors. Flow sensors, for example, can be utilized for measure flow rates in a variety of commercial, industrial and medical applications. Various medical, process, and industrial applications, ranging from portable ventilators supplying anesthetizing agents to large-scale processing plants in a chemical plant require the use of flow sensors. In such applications, flow control is an inherent aspect of proper operation, which can be achieved in part by utilizing flow sensors to measure the flow rate of fluid within a flow system. In medical applications, for example, it is often required to accurately measure the flow rates of fluids introduced intravenously to medical patients and thereby control the flow rate of such fluids.

In many flow systems, e.g., fuel gas flow systems containing a binary mixture of methanol and water, the chemical composition of the fluid may change frequently. Also, a particular flow system may be required to flow more than one fluid having different chemical and thermo-physical properties. For example, in a semiconductor processing system that passes an $N_2$ gas, the N2 gas may at times be replaced by $H_2$ or helium gas, depending on the needs of the process; or in a natural gas metering system, the composition of the natural gas may change due to non-uniform concentration profiles of the gas. Thus, measuring the flow rates of fluids, including those of differing chemical compositions (e.g., differing in density, thermal conductivity, specific heat, etc.) requires precise and efficient flow sensor devices.

In many flow sensing applications, a need exists for disposable flow sensor devices. One advantage of disposable devices is that they can be manufactured inexpensively and in greater quantities. Such devices are well-suited for limited use applications. One of the problems with conventional flow sensor packages is the difficulty in configuring such devices for both limited use and in an inexpensive and efficient manner. It is believed that the flow sensor device disclosed herein overcomes the limitations of conventional flow sensor devices.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved flow sensing device.

It is another aspect of the present invention to provide for a disposable flow sensor.

It is yet a further aspect of the present invention to provide for a sensor die and electronic processing components thereof.

The aforementioned aspects of the invention and other objectives and advantages can now be achieved as described. A disposable fluid flow sensor is disclosed herein, which generally includes a flow channel assembly comprising a flow channel tube in association with a disposable flow channel portion. A sensor die can also be located approximate to a thin interface or thin membrane formed from the disposable flow channel portion. The sensor die can measure a flow of fluid flowing through the flow channel tube and the disposable flow channel portion of the flow channel assembly.

The thin interface can be preferably implemented in the context of an isolated sensor die configuration, which is described in greater detail herein. In such an "isolated" sensor die approach, a thin membrane material or thin interface prevents the fluid from touching the surface of the sensor die. In such an "isolated" system, the sensor die is not actually part of the disposable flow tube assembly. The only disposable portion in this approach is the flow tube itself.

Additionally, a substrate can be provided upon which the sensor die is formed and located. A seal can also be provided for sealing the disposable flow channel portion to the flow channel tube. The thin interface can comprise, for example, polyester. Additionally, the flow channel tube and the disposable flow channel portion together can form a continuous flow channel through which fluid flow. The flow channel itself can be configured as a D-shaped flow channel or a three-side flow channel. Additionally, signal processing electronics can be provided, which communicate with the flow sensor.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a side view of the fluid flow sensor depicted in FIG. 1, in accordance with an alternative embodiment of the present invention;

FIG. 3 illustrates a D-shaped flow channel, which can be implemented in accordance with an alternative embodiment of the present invention;

FIG. 4 illustrates a three-sided flow channel interfaced to a thin wall of a flow sensor, in accordance with an alternative embodiment of the present invention;

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
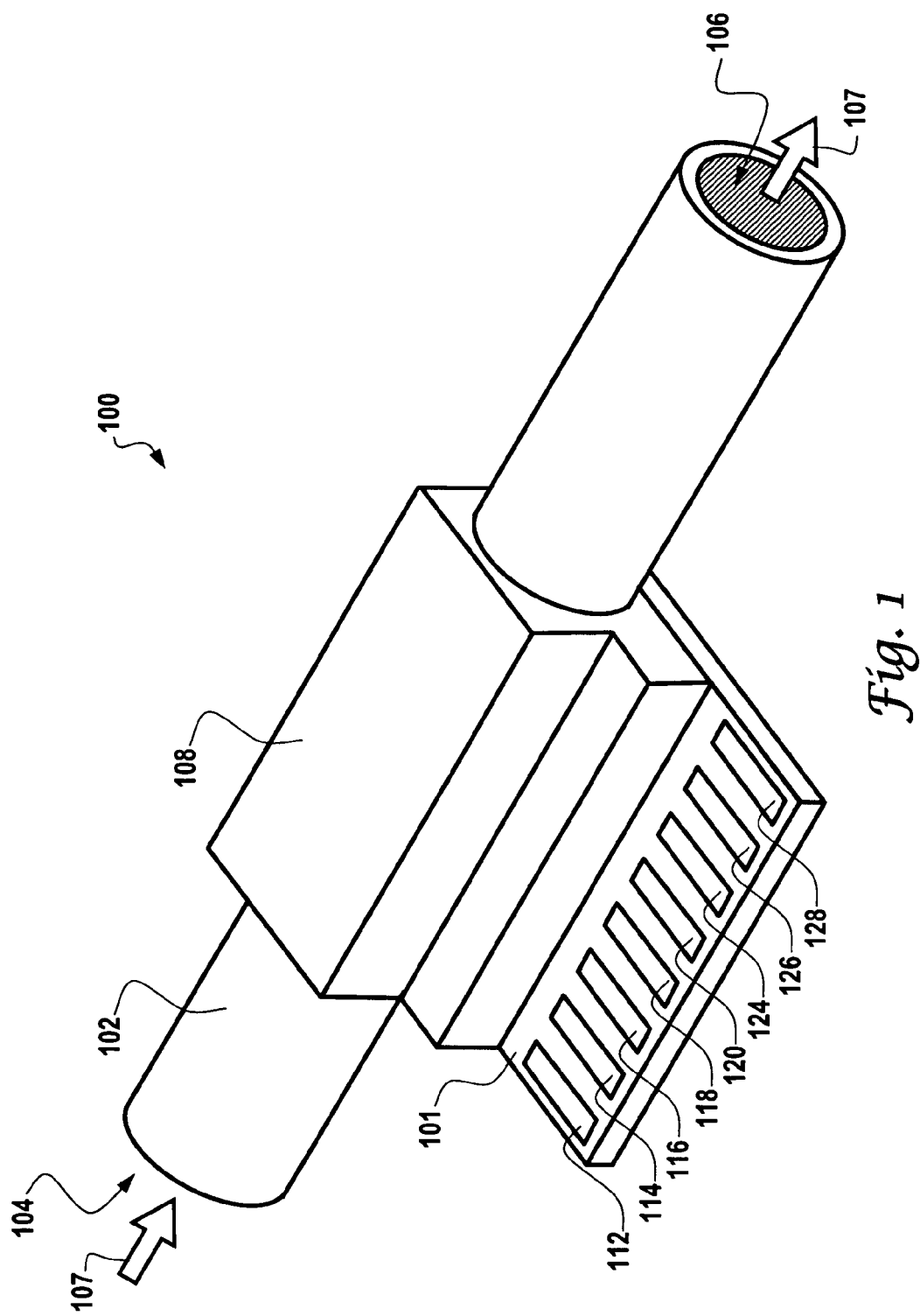
FIG. 1 illustrates a perspective view of a disposable fluid flow sensor, which can be implemented in accordance with a preferred embodiment of the present invention.

FIG. 1 illustrates a perspective view of a disposable fluid flow sensor 100, which can be implemented in accordance with a preferred embodiment of the present invention. Fluid flow sensor 100 generally includes a flow channel tube 102 which includes an entry portion 104 and an exit portion 106. Fluid flow into entry portion 104 and out of exit portion 106 is generally indicated by arrow 107. In the configuration depicted in FIG. 1, a flow channel assembly generally 108 surrounds flow channel tube 102 and can be connected to a substrate 101 upon which a plurality of electronic components 112, 114, 116, 118, 120, 124, 126 and 128 can be formed and located. Note that the electronic components 112, 114, 116, 118, 120, 124, 126 and 128 can be, for example, electronic contacts to which electrical wires and other electrical contacts be connected in order to provide electrical signals and communicate with fluid flow sensor 100.

Note that FIG. 1 illustrates a preferred embodiment, while FIG. 2 depicts an alternative embodiment, although similar parts and reference numerals are utilized to refer to similar or identical components in both configurations. The embodiment disclosed in FIG. 1 generally refers to an arrangement in which the sensor die, substrate and flow tube can be assembled together into one complete disposable assembly, such as, fore example, flow channel assembly 108. The approach depicted in FIG. 1 illustrates a "non-isolated" sensor die approach in which a thin interface does not cover a sensor die thereof. In the "non-isolated" approach, the media generally flows across the bare sensor die 110.

The configuration depicted in FIG. 2, on the other hand, illustrates an alternative disposable flow sensor configuration, one which can be referred to as an "isolated" approach. In the configuration depicted in FIG. 2, a thin membrane or interface can be implemented which keeps the fluid from touching surface of the sensor die (i.e., see FIG. 2). In such a configuration, the sensor die is not part of the disposable flow tube assembly, i.e., the only disposable portion is the flow tube. Note that in the case of an isolated assembly, such as that depicted in FIG. 2, the sensor die 110 can be located on the disposable side or part of the durable side of the flow channel.

FIG. 2 therefore illustrates a side view of an alternative version of the fluid flow sensor 100 depicted in FIG. 1. In the alternative embodiment of FIG. 2, a sensor die 110 is provided, which is located proximate to a thin membrane or thin interface 111. Note that the thin interface 111 can be formed from a material such as, for example, a 0.001 inch polyester material.

The thin interface 111 is an important feature for obtaining minimum power dissipation and maximum sensitivity. Flow of fluid through the disposable flow channel portion 121 is generally indicated by arrow 107. Note that in FIGS. 1–4, identical or similar parts or components are generally indicated by identical reference numerals. A seal 131 can be located between disposable flow channel portion 121 and flow channel tube 102. In the configuration of FIG. 2, sensor die 110 is generally located in intimate contact with the membrane or thin interface 111.

Sensor die 110 can be configured as a rugged flow sensor die, which interfaces with a flow channel formed from flow channel tube 102 and disposable flow channel portion 121. Disposable flow channel portion 121 and flow channel tube 102 can be integrated with one another or interface with one another as separate components, depending upon design considerations. Thus, the flow channel formed from disposable flow channel portion 121 and flow channel tube 102, together with the rugged sensor die 110, can interface with durable underlying electronics, such as, for example, electronic components 114, 116, 118, 120, 124, 126 and 128. Signal processing circuits can be, for example, connected to electronic components 114, 116, 118, 120, 124, 126 and 128. In a medical application, for example, flow channel tube 102 can be implemented as an IV tube set for the intravenous delivery of saline and other fluids, including blood, to a patient.

In general, the embodiment depicted in FIG. 1 is composed of several parts or elements, including a sensor die 110, a substrate 101, a seal 131, and flow channel assembly 108. Sensor die 110 can utilize either front-wire bonds or through-the-wafer inter-connect technology, depending upon design considerations. The substrate 101 can be either rigid or flexible or some combination thereof. The seal 131 can be an epoxy pre-form, O-ring, and/or elastomer, again, depending upon design considerations. The flow channel formed from flow channel tube 102 and/or disposable flow channel portion 121 can be molded or formed from machined-plastic and/or machined glass.

Thus, the four elements—sensor die 110, a substrate 101, a seal 131, and flow channel assembly 108—come together in a such a manner that they form a water-tight seal, while simultaneously ensuring proper flow channel alignment to the sensor die 110 as well as proper electrical connections between the sensor die 110 and substrate 101. Such a packaging design therefore allows for a quick and easy interface between sensor die 110 and any underlying signal process electronics.

FIG. 3 illustrates a D-shaped flow channel 120, which can be implemented in accordance with an alternative embodiment of the present invention. In FIG. 3, sensor die 110 is located proximate to the thin interface 111, which forms part of the walls of a D-shaped flow channel 120 of a D-shaped tube 109. The D-shaped tube 109 depicted in FIG. 3 is therefore analogous to flow channel tube 102 and/or disposable flow channel portion 121 depicted in FIGS. 1–2.

FIG. 4 illustrates a three-sided flow channel 122 interfaced to a thin wall 111 of a flow sensor, in accordance with an alternative embodiment of the present invention. In FIG. 3, sensor 110 is located proximate to the thin wall or interface 111, which forms one of the walls of the three sided flow channel 122 of a rectangular shaped tube 113. Note that the rectangular shaped tube 112 depicted in FIG. 4 is generally analogous to the flow channel tube 102 and/or disposable flow channel portion 121 depicted in FIGS. 1–2.

Figure 5:
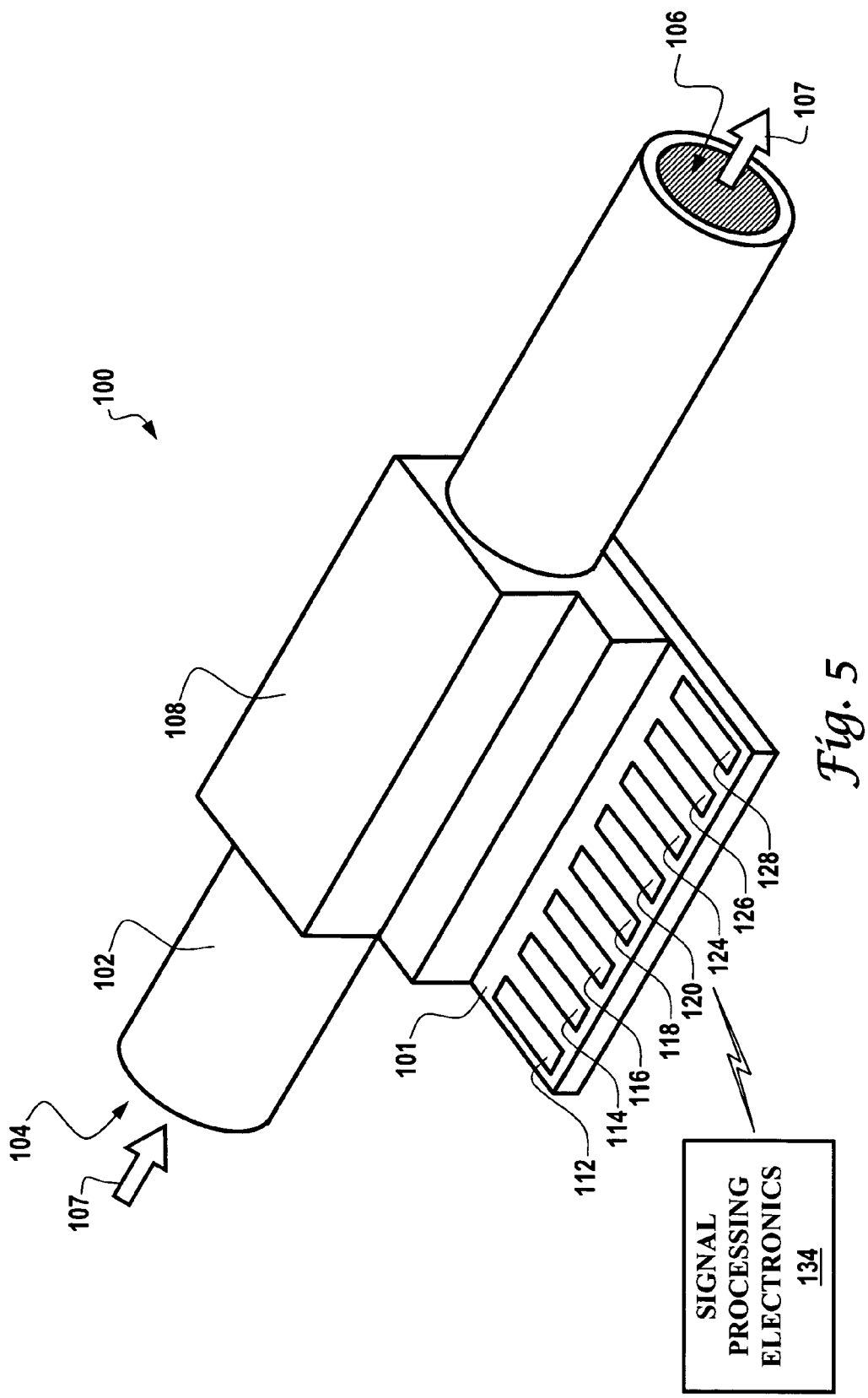
FIG. 5 illustrates a cross-sectional side view of a non-isolated flow sensor configuration, which can be implemented in accordance with an alternative embodiment of the present invention.

FIG. 5 illustrates a perspective view of the disposable fluid flow sensor 100 depicted in FIGS. 1–2, in accordance with an alternative embodiment of the present invention. In FIGS. 1–2 and 5, identical or similar parts or elements are generally indicated by identical reference numerals. Note, however, that in FIG. 5, a block representing signal processing electronics 134 is illustrated to indicate that flow sensor 100 can communicate with such signal processing electronics 134.

Flow sensor 100 generally can possess a flow range of 5 uL/min to 500 mL/min and an accuracy of approximately 2%–4%, depending upon design considerations. Additionally sensor die 110 can be implemented as a non-isolated die, in association with biocompatible materials, and low cost, disposable packaging, and durable electronics. Applications of flow sensor 100 include, for example, volumetric infusion pumps, syringe pumps, peritoneal dialysis equipment, insulin infusion pumps, and lab-on-chip devices.

In the case of the fluid flow sensor 100 depicted herein, fluid may actually touch the surface of the sensor die 110 (i.e., non-isolated sensor die) and therefore the surface plane of the sensor die 110 would be in-line with the plane of the wall of the tubing, so as to eliminate any "pockets" or "cavities" of fluid from the flow path through the plastic tube (i.e., flow channel tube 102 and/or disposable flow channel portion 121).

A "D" shaped channel design can therefore be implemented for the flow path over the sensor die 110, as depicted in FIG. 3. Note additionally that the term "fluid" as utilized herein can refer to a liquid and/or a gas, depending upon design considerations. Thus, in one embodiment, fluid flow sensor 100 may be utilized for sensing the flow of liquid, while in another embodiment, fluid flow sensor 100 may sense the flow of gas. Still, in another embodiment, fluid flow sensor 100 may sense the flow gas and fluid.

Figure 6:
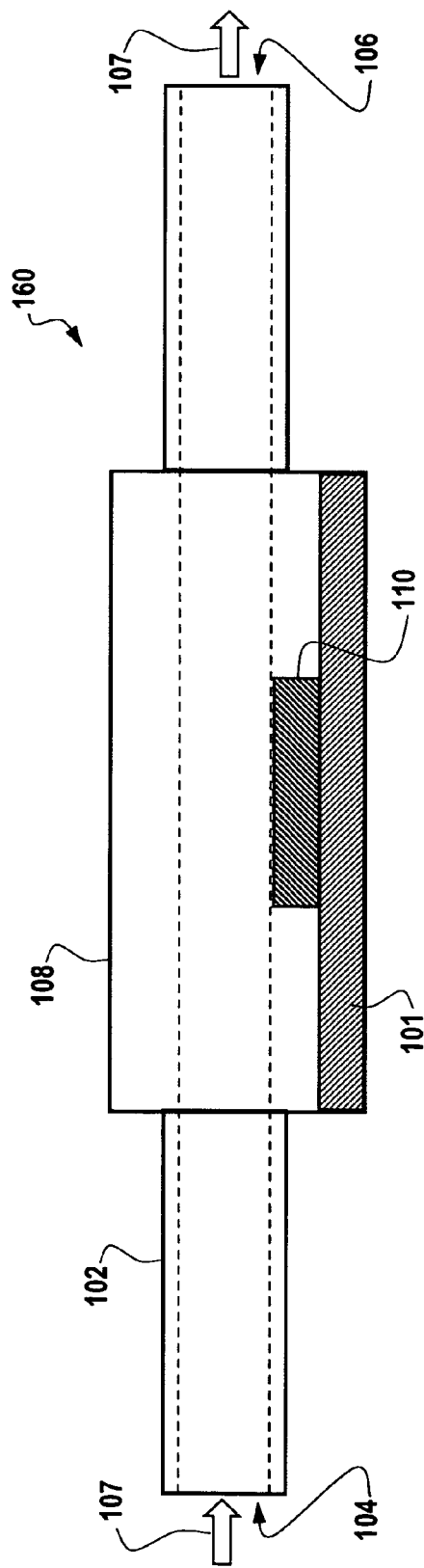
FIGS. 6 & 7 illustrate D-shaped flow channel configurations for flow sensors, which can be implemented in accordance with alternative embodiments of the present invention.

FIG. 6 illustrates a cross-sectional side view of a non-isolated flow sensor configuration, which can be implemented in accordance with an alternative embodiment of the present invention. Note that in FIGS. 1 and 5, similar or identical parts or elements are generally indicated by identical reference numerals. FIG. 6 depicts a flow sensor 160, which includes sensor die 110, substrate 101 and flow channel assembly 108. Flow sensor 160 of FIG. 6 is similar to that of flow sensor 100 illustrated herein. In the configuration of FIG. 6, however, sensor die 110 is located on a tangent to the radius of the flow channel tube 102.

Figure 7:
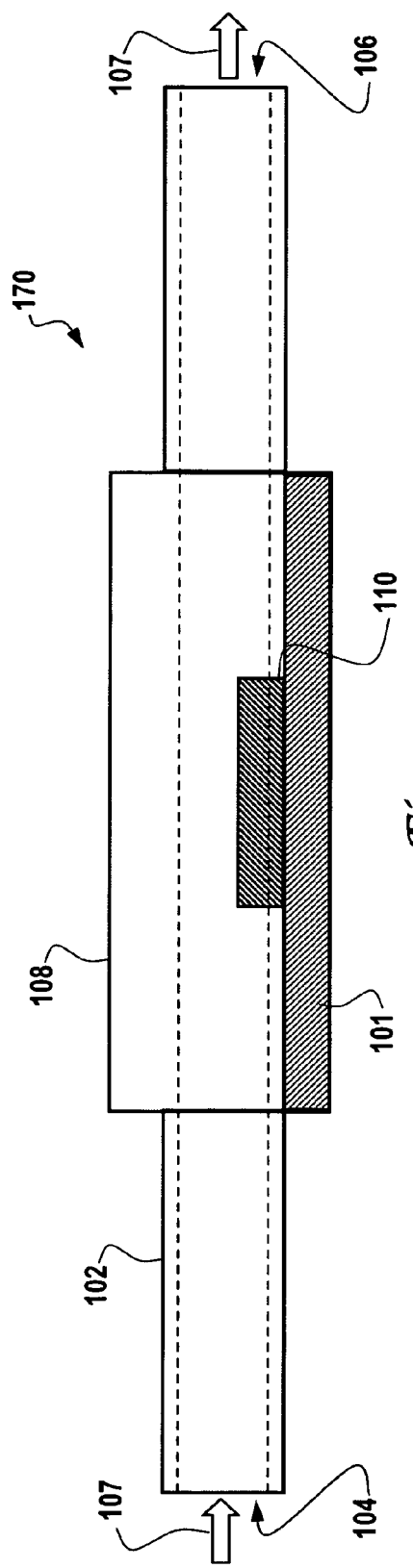

FIG. 7, on the other hand, illustrates a D-shaped flow channel configuration for a flow sensor 170, which can be implemented in accordance with an alternative embodiment of the present invention. Flow sensor 170 is similar to that of flow sensor 160 and flow sensor 100, the difference being that in the configuration depicted in FIG. 7, the sensor die 110 protrudes into the flow stream, creating a D-shaped flow channel above the sensor die 110. The configuration of FIG. 7 is thus similar to the D-shaped configuration of FIG. 3.

Based on the foregoing, it can be appreciated that a disposable fluid flow sensor is disclosed, which generally includes a flow channel assembly comprising a flow channel tube in association with a disposable flow channel portion. A sensor die is located approximate to a thin interface or membrane formed from the disposable flow channel portion, such that the sensor die measures a flow of fluid flowing through the flow channel tube and the disposable flow channel portion of the flow channel assembly. Additionally, a substrate can be provided upon which the sensor die is formed and located. A seal can also be provided for sealing the disposable flow channel portion to the flow channel tube.

Such a flow sensor can be implemented in the context of a "non-isolated" sensor die approach in which the sensor die, substrate and flow tube are assembled together into a complete disposable assembly, in which a thin interface does not cover the sensor die. The flow sensor can alternatively be implemented in the context of an "isolated" sensor die approach in which a thin membrane material or thin interface prevents the fluid from touching the surface of the sensor die. In such an "isolated" configuration, the sensor die is not actually part of the disposable flow tube assembly. The only disposable portion in this approach is the flow tube itself.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention

The invention claimed is:

1. A disposable fluid flow sensor, comprising:
   a flow channel assembly comprising a flow channel tube in association with a disposable flow channel portion;
   a sensor die located approximate to a thin interface formed from said disposable flow channel portion, wherein said sensor die measures a flow of fluid flowing through said flow channel tube and said disposable flow channel portion of said flow channel assembly, said thin interface preventing said fluid from touching a surface of said sensor die; and
   a substrate upon which said sensor die is formed and located and a seal for sealing said disposable flow channel portion to said flow channel tube.

2. The sensor of claim 1 wherein said thin interface comprises polyester.

3. The sensor of claim 1 wherein flow channel tube and said disposable flow channel portion together form a continuous flow channel through which fluid can flow.

4. The sensor of claim 3 wherein said flow channel comprises a D-shaped flow channel.

5. The sensor of claim 3 wherein said flow channel comprises a three-sided flow channel.

6. The sensor of claim 1 further comprising signal processing electronics which communicate with said sensor die.

7. The sensor of claim 1 wherein said sensor die, said substrate and said flow channel assembly are arranged together to comprise a complete disposable assembly.

8. The sensor of claim 1 wherein said sensor die is located on a tangent to a radius of said flow channel tube.

9. The sensor of claim 1 wherein said seal comprises an O-ring.

10. The sensor of claim 1 wherein said seal comprises an elastomer.

11. A disposable fluid flow sensor, comprising:
    a flow channel assembly comprising a flow channel tube in association with a disposable flow channel portion, wherein flow channel tube and said disposable flow channel portion together form a continuous flow channel through which fluid can flow;

a sensor die located approximate to a thin interface formed from said disposable flow channel portion, wherein said sensor die measures a flow of fluid flowing through said flow channel tube and said disposable flow channel portion of said flow channel assembly, said thin interface preventing said fluid from touching a surface of said sensor die;

a substrate upon which said sensor die is formed and located and a seal comprising an O-ring for sealing said disposable flow channel portion to said flow channel tube; and signal processing electronics which communicate with said sensor die.

12. A disposable fluid flow sensor method, comprising the steps of:

associating a flow channel assembly comprising a flow channel tube with a disposable flow channel portion;

locating a sensor die approximate to a thin interface formed from said disposable flow channel portion, wherein said sensor die measures a flow of fluid flowing through said flow channel tube and said disposable flow channel portion of said flow channel assembly, said thin interface preventing said fluid from touching a surface of said sensor die; and forming and locating a sensor die upon a substrate; and providing a seal for sealing said disposable flow channel portion to said flow channel tube.

13. The method of claim 12 further comprising the step of providing said thin interface as polyester.

14. The method of claim 12 further comprising the step of arranging said flow channel tube and said disposable flow channel portion together to form a continuous flow channel through which fluid can flow.

15. The method of claim 14 further comprising the step of configuring said flow channel to comprise a D-shaped flow channel.

16. The method of claim 14 wherein further comprising the step of configuring said flow channel to comprise a three-sided flow channel.

17. The method of claim 12 further comprising the step of providing signal processing electronics which communicate with said sensor die.

18. The method of claim 12 further comprising the step of arranging said sensor die, said substrate and said flow channel assembly into a complete disposable assembly.

* * * * *